United States Patent
Terasaki et al.

(10) Patent No.: US 8,537,571 B2
(45) Date of Patent: Sep. 17, 2013

(54) ELECTRIC POWER SUPPLY APPARATUS ATTACHED TO OVERHEAD LINE TO SUPPLY ELECTRIC POWER TO LOAD

(75) Inventors: Kouji Terasaki, Fukuoka (JP); Hidenori Oda, Fukuoka (JP); Hiroaki Kamohara, Fukuoka (JP)

(73) Assignee: Dyden Corporation, Fukuoka (JP)

( * ) Notice: Subject to any disclaimer, the term of this patent is extended or adjusted under 35 U.S.C. 154(b) by 399 days.

(21) Appl. No.: 12/734,926

(22) PCT Filed: Nov. 28, 2008

(86) PCT No.: PCT/JP2008/071691
§ 371 (c)(1),
(2), (4) Date: Jul. 26, 2010

(87) PCT Pub. No.: WO2009/072444
PCT Pub. Date: Jun. 11, 2009

(65) Prior Publication Data
US 2010/0292859 A1 Nov. 18, 2010

(30) Foreign Application Priority Data

Dec. 4, 2007 (JP) ................. 2007-313605

(51) Int. Cl.
*H02M 3/335* (2006.01)
*H03G 1/00* (2006.01)

(52) U.S. Cl.
USPC ........................ 363/21.02; 323/352

(58) Field of Classification Search
USPC ..................... 323/352; 363/21.02
See application file for complete search history.

(56) References Cited

U.S. PATENT DOCUMENTS

| 4,568,808 | A * | 2/1986 | Thuries et al. ............ 200/48 V |
| 4,963,819 | A * | 10/1990 | Clarke et al. .................. 324/126 |
| 5,343,381 | A * | 8/1994 | Bolduc et al. .................... 363/47 |
| 6,462,964 | B2 * | 10/2002 | Porter et al. ................ 363/21.01 |
| 6,535,108 | B1 * | 3/2003 | Schrott et al. ................ 340/10.1 |
| 6,985,370 | B2 * | 1/2006 | Kerstetter ........................ 363/39 |
| 2005/0036338 | A1 * | 2/2005 | Porter et al. ............... 363/21.01 |

FOREIGN PATENT DOCUMENTS

| JP | 52-046492 | 4/1977 |
| JP | 2001-258183 | 9/2001 |
| JP | 2003-284252 | 10/2003 |

OTHER PUBLICATIONS

International Search Report; International Application No. PCT/JP2008/071691; Dated: Feb. 10, 2009.

* cited by examiner

*Primary Examiner* — Adolf Berhane
*Assistant Examiner* — Emily Pham
(74) *Attorney, Agent, or Firm* — Rader, Fishman & Grauer PLLC

(57) ABSTRACT

A power supply device comprises a capacitance (Ca) consisting of an overhead power line (100) and an electrode (20) extending in the longitudinal direction of the overhead power line (100) via an insulator (30), an inductance (La) connected in parallel with the capacitance (Ca), and an output portion (50) led out from both ends of a parallel circuit including the capacitance (Ca) and the inductance (La). The parallel circuit is operated as a parallel resonant circuit and power is supplied from the output portion (50), thereby obtaining a compact and simple structure and improving power supply efficiency to a load as compared with a conventional power supply device.

15 Claims, 13 Drawing Sheets

Figure 1A:
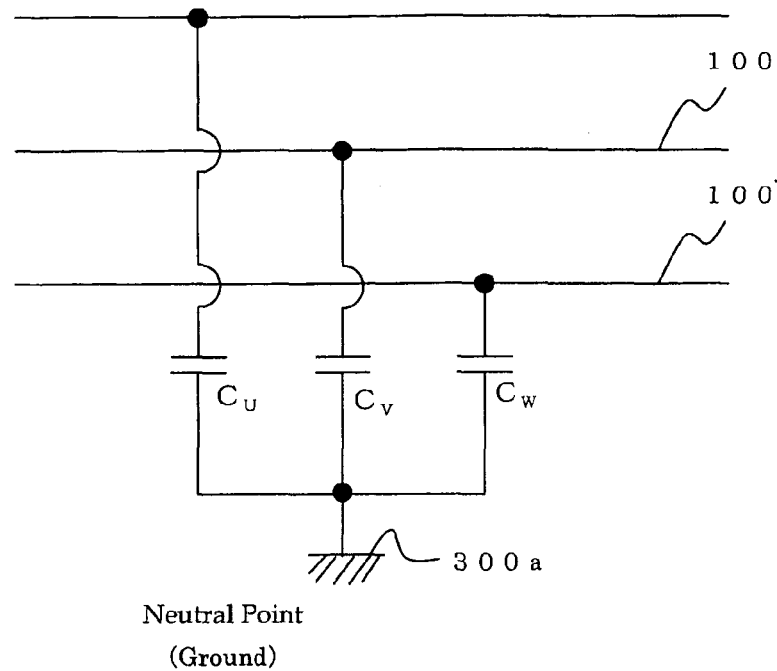

Neutral Point
(Ground)

ELECTRIC POWER SUPPLY APPARATUS ATTACHED TO OVERHEAD LINE TO SUPPLY ELECTRIC POWER TO LOAD

TECHNICAL FIELD

The present invention relates to an electric power supply apparatus for supplying electric power to a load such as a piece of electric equipment, which is attached to an overhead linear conductor provided along an overhead power line such as a power transmission line, an overhead power line of an electric distribution line, an overhead ground line, an communication line (e.g., a metal communication cable, an optical cable or the like, held by a messenger wire), a branch line or the like (the overhead power line and the overhead linear conductor are generally referred to as an overhead line, hereinafter), for example, a measurement device for measuring states of the overhead line (a voltage, a current, a temperature, a movement or the like) or environmental conditions of the overhead line (a speed of wind, an amount of insolation, an atmospheric pressure or the like), a communication device for communicating states of the overhead line in a wire manner or a wireless manner, an indicator lamp for indicating an existence of the overhead line, an indicator for indicating that the overhead line is a hot line or the like.

BACKGROUND OF ART

Conventionally, for an electric power source of a piece of electric equipment attached to an overhead power line, a battery is used. Nevertheless, due to a lifetime of the buttery, in a two- or three-year cycle, an exchange of the battery is carried out in a hot line work manner or a power cut manner.

On the other hand, there is a case where a solar battery is used for an electric power source of a piece of electric equipment attached to an overhead power line. Nevertheless, since the solar battery must be large-scale in order to secure a sufficient generation capacity, it is difficult to attach the large-scale solar battery to an overhead power line. Also, a battery must be used together with the solar battery in order to ensure an operation of a piece of electric equipment for the night. As a result, there is a problem that not only weight of the electric power source is increased, but also an exchange of the battery is needed.

For this reason, at present, the electric power source system concerned, which involves a frequency of maintenance to an overhead power line causing a high possible electric shock as a high voltage power line, does not widely prevails.

In this circumstance, attempts have been made to develop an apparatus which can obtain an electric power by attaching it to an overhead power line without any battery, and which can secure an electric power even if any current does not flow through the overhead power line.

For example, in a conventional night indicator device of an overhead power transmission line, one terminal of a neon discharge tube is adhered to the power transmission line, and the other terminal of the neon discharge tube is coated with an insulating material, and is wound around the power transmission line at suitable intervals. It is disclosed that the neon discharge tube is lighted due to electrostatic induction caused between the coated line and the power transmission line. Also, it is disclosed as conventional arts that an overhead power transmission line is covered with a metal pipe, ends of which are coaxially held with dielectric materials, and that a damper line made of conductor is suspended from an overhead power transmission line through an insulator (for example, see: Patent Document 1).

Also, as a conventional electrostatic induction type electric power supply apparatus, is disclosed an apparatus including an insulator spirally wound around a power line conductor in an electrical substation, an electrode spirally wound over the insulator, and a rectifying circuit in which an input lead drawn from the electrode and an input lead drawn from the power line conductor are used as a primary side input, and in which a secondary side is connected to a sensor (for example, see: Patent Document 2).

Also, as a conventional electric power supply apparatus for a measurement device of a power transmission/distribution system, is disclosed an apparatus including a protecting circuit for converting a voltage obtained from a spatial electrode into a suitable voltage to thereby controlling an excess voltage, a rectifying circuit for converting an voltage from the protecting circuit from an alternating current into a direct current, a storage battery for storing electricity output from the rectifying circuit, a voltage detector for detecting a voltage of the storage battery, and a voltage generator for intermittently outputting a necessary voltage to a load of a measurement device based on a detected voltage (for example, see: Patent Document 3).

Patent Document 1: JUM-S39-29852 A
Patent Document 2: JP-H10-262349 A
Patent Document 3: JP-2003-284252 A

DISCLOSURE OF THE INVENTION

Problems to be Resolved by the Invention

In the conventional night indicator device of an overhead power transmission line and the conventional electrostatic induction type electric power supply apparatus, an insulating material is laid over a power transmission line (power line conductor), and then a conductor (electrode) is laid over the insulating material, so that a capacitance ($C_X$ of the insulating material) between the power transmission line and the conductor and a capacitance (space C) between the conductor and the ground are connected in series to each other, with a load being directly connected to both the electrodes of the capacitance between the power transmission line and the conductor, or being connected to both the electrodes of the capacitance between the power transmission line and the conductor through the intermediary of a rectifying circuit. That is, as shown in FIG. 13($a$), equivalently, a series circuit of two capacitances is obtained, and the load 200 is connected in parallel to the capacitance ($C_X$ of the insulating material) between the power transmission line 100$a$ and the conductor. FIG. 13($a$) is an equivalent circuit of the conventional night indicator device of an overhead power transmission line and the conventional electrostatic induction type electric power supply apparatus. Note, in FIG. 13($a$), reference 201$a$ indicates the rectifying circuit, and reference 300 indicates the ground.

Also, in the conventional electric power supply apparatus for the measurement device of the power transmission/distribution system, two electrodes are coaxially disposed with respect to a power transmission/distribution line, and are spaced from each other. Thus, as shown in FIG. 13($b$), is obtained a series circuit in which a capacitance ($C_1$ of an insulating material) between the power transmission/distribution line 100$b$ and one of the electrodes, a capacitance ($C_X$ of an insulating material) between the electrodes, and a capacitance (space C) between the other electrode and the ground are connected in series to each other, and a load 200 is connected in parallel to the middle capacitance ($C_X$ of the insulating material). FIG. 13($b$) is an equivalent circuit of the conventional electric power supply apparatus for the measurement device of the power transmission/distribution system. Note, in FIG. 13(b), reference 201 indicates a power supply circuit section including a protecting circuit, a rectifying circuit and so on, and reference 300 indicates the ground.

In the equivalent circuit of the conventional night indicator device of an overhead power transmission line and the conventional electrostatic induction type electric power supply apparatus (which is referred to as the conventional electric power supply apparatus, hereinafter), the capacitance of the space C is very small because a space between the electrode and the ground is very large, and because spaces among phases 100a of the power transmission line 100a also are very large, and thus may be on the order of 10 pF per 1 m length of the electrode. When this capacitance is converted into impedance, it has a large value as generally 300 MΩ in the network frequency. Especially, in the power transmission line 100a in which a large power is transmitted, the space between the power transmission line 100a and the ground 300 becomes larger, and because the spaces among phases 100a of the power transmission line 100a also becomes larger, and thus it is general that the impedance has further large value.

Figure 13A:
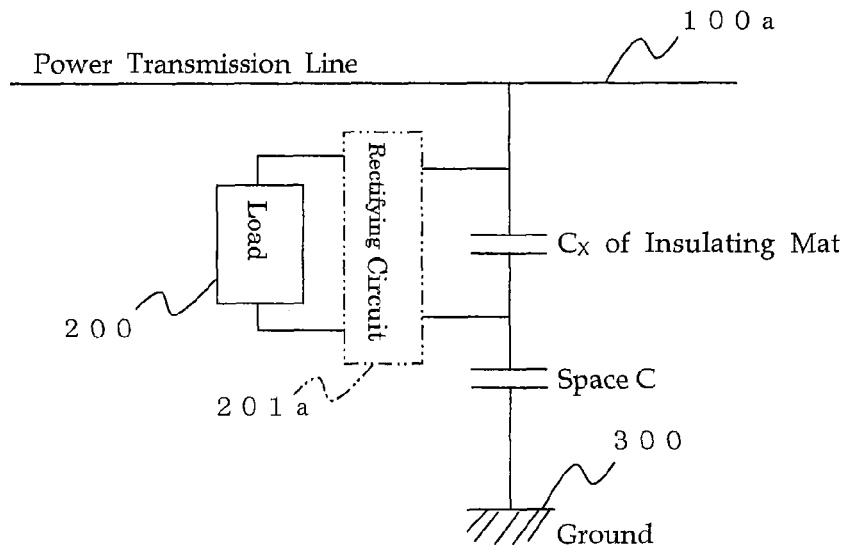
Figure 13B:
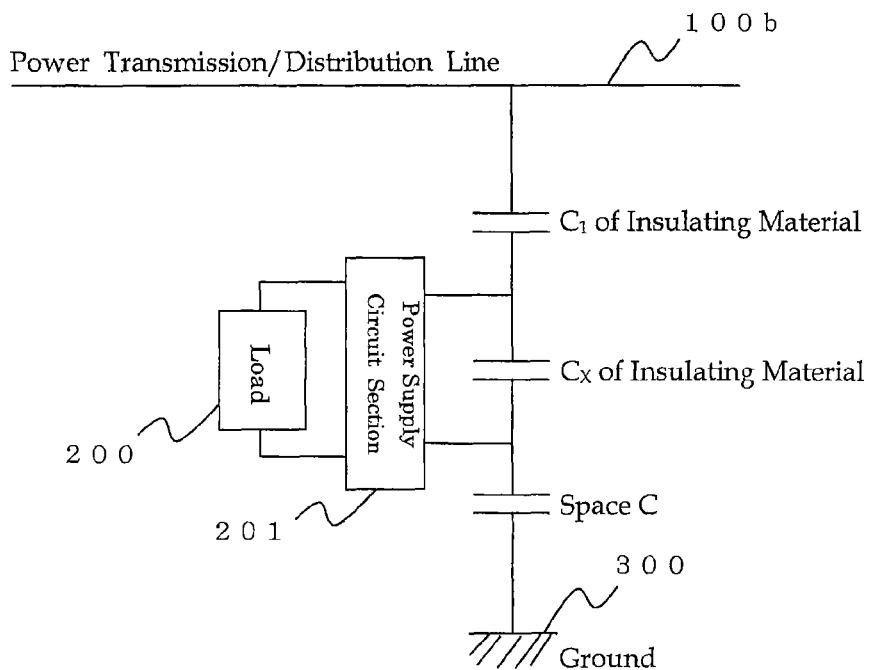

On the other hand, in FIGS. 13(a) and 13(b), since a major part of a synthetic impedance of both the capacitance $C_X$ and the load 200 provided in parallel thereto is derived from the load 200, a value of the synthetic impedance is less than several kΩ.

In the capacitor-serial circuit of the conventional electric power apparatus, since the impedance between the electrode and the ground is predominately larger than a synthetic impedance of the parallel section of both the load 200 and the capacitance $C_X$, and since a voltage applied to the load 200 depends on a ratio between the synthetic impedance of both the load 200 and the capacitance $C_X$ and the impedance between the electrode and the ground (in the case of FIG. 13(b), the voltage is further concerned with a ratio to an impedance of the capacitance $C_1$), it is hardly generated in the load 200.

Also, although a current flowing through the circuit depends on a synthetic impedance which is synthesized from the synthetic impedance of both the load 200 and the capacitance $C_X$ and the impedance between the electrode and the ground (in the case of FIG. 13(b), the synthetic impedance concerned is further synthesized from the impedance of the capacitance $C_1$), the current has a very small value, with which the space C is charged, due to the large capacitance between the electrode and the ground.

Further, at the parallel section of both the load 200 and the capacitance $C_X$, the current flowing through the circuit separates into two parts which are directed to the load 200 and the capacitance $C_X$, respectively, and, in the capacitance $C_X$ formed of an insulating material, an electric power is consumed. Thus, there is a problem that an efficiency of the electric power supply apparatus is very inferior.

Especially, in the conventional electric power supply source apparatus, in order to improve the inferior efficiency to thereby supply a necessary electric power to the load 200, a measure must be taken to increase the length and a thickness of the electrode to thereby swell the capacitances among the overhead power lines and the ground, and a measure must be taken to use a secondary battery in which an electric power is gently stored so that a voltage more than a given level is intermittently generated to thereby operate the load. Nevertheless, there is a problem that not only the electric power supply apparatus has a large sizes, but also the circuit is very complicated.

The present invention has been developed to solve the aforesaid problems, and aims at providing provide an electric power supply apparatus which can be compactly and simply constructed, and in which a power supply efficiency to a load more improved in comparison with conventional electric power supply apparatuses.

Means for Solving the Problems

The electric power supply apparatus according to the present invention comprises: a capacitance defined by an overhead line, and an electrode extending along said overhead line in a longitudinal direction thereof, with a dielectric being intervened therebetween; an inductance connected in parallel to said capacitance; and an output section drawn from both ends of a parallel circuit including said capacitance and said inductance, wherein said parallel circuit is formed as a parallel resonance circuit, and wherein an electric power is output from said output section.

Also, in the electric power supply apparatus according to the present invention, if necessary, said inductance may be formed as a variable inductance, and a value of said variable inductance is adjusted so that said parallel circuit is operated as the parallel resonance circuit.

Also, the electric power supply apparatus according to the present invention further may comprise a variable capacitance connected in parallel to said capacitance, and a value of said variable capacitance is adjusted so that said parallel circuit is operated as the parallel resonance circuit.

Further, if necessary, the electric power supply apparatus according to the present invention may further comprise a transformer in which a primary voltage is stepped down, and in which a secondary voltage is output, and said inductance corresponds to an excitation susceptance component of said transformer, said output section being at a secondary side of said transformer.

Also, if necessary, the electric power supply apparatus according to the present invention may further comprise: a transformer in which a primary voltage is stepped down, and in which a secondary voltage is output; and an inductance connected in parallel at the secondary side of said transformer to a secondary winding thereof, and the inductance connected in parallel to said capacitance corresponds to an excitation susceptance component of said transformer, said output section being at a secondary side of said transformer.

Also, in the electric power supply apparatus according to the present invention, if necessary, the inductance connected in parallel at the secondary side of said transformer to the secondary winding thereof may be a variable inductance, and a value of said variable inductance is adjusted so that said parallel circuit is operated as the parallel resonance circuit.

Also, in the electric power supply apparatus according to the present invention, if necessary, said electrode may be a tubular conductor by which a given length of said overhead line is enclosed.

Also, in the electric power supply apparatus according to the present invention, if necessary, said electrode may comprise a plurality of tubular conductors which have different diameters so that one of said tubular conductors is inserted into and abutted to another tubular conductor, and so that one of said tubular conductors is slidably received in another tubular conductor.

Further, in the electric power supply apparatus according to the present invention, if necessary, said electrode may be defined by connecting a plurality of tubular conductors to each other.

EFFECT OF THE INVENTION

The electric power supply apparatus according to the present invention comprises: a capacitance defined by an overhead line, and an electrode extending along said overhead line in a longitudinal direction thereof, with a dielectric being intervened therebetween; an inductance connected in parallel to said capacitance; and an output section drawn from both ends of a parallel circuit including said capacitance and said inductance, wherein said parallel circuit is formed as a parallel resonance circuit, and wherein an electric power is output from said output section. With this arrangement, all the current can flow into the load side, and thus the electric power supply apparatus features a superior current-entering efficiency to the load.

Also, in the electric power supply apparatus according to the present invention, if necessary, said inductance may be formed as a variable inductance, and a value of said variable inductance is adjusted so that said parallel circuit is operated as the parallel resonance circuit. With this arrangement, it is unnecessary to previously select circuit parts of the inductance so that the requirements for the parallel resonance to the capacitance are satisfied, and it is possible to accommodate the electric power supply apparatus to a variety of overhead power lines, to which the electric power supply apparatus should be attached. Especially, even if a length of the electrode is varied in accordance with a power consumption of the load, it is possible to obtain the requirements for the parallel resonance by adjusting a value of the variable inductance.

Also, the electric power supply apparatus according to the present invention further may comprise a variable capacitance connected in parallel to said capacitance, and a value of said variable capacitance is adjusted so that said parallel circuit is operated as the parallel resonance circuit. With this arrangement, it is unnecessary to previously select circuit parts of the inductance so that the requirements for the parallel resonance to the capacitance are satisfied, and it is possible to accommodate the electric power supply apparatus to a variety of overhead power lines, to which the electric power supply apparatus should be attached. Especially, even if a length of the electrode is varied in accordance with a power consumption of the load, it is possible to obtain the requirements for the parallel resonance by adjusting a value of the variable capacitance.

Further, if necessary, the electric power supply apparatus according to the present invention may further comprise a transformer in which a primary voltage is stepped down, and in which a secondary voltage is output, and said inductance corresponds to an excitation susceptance component of said transformer, said output section being at a secondary side of said transformer. With this arrangement, the excitation susceptance and the capacitance (or a synthetic value of the capacitance and the variable capacitance) form the parallel resonance circuit, and thus it is possible to improve a current-entering efficiency to the load. Also, it is possible to make an impedance of the load to be larger at the primary side, and the primary voltage of the transformer, generated by a divided voltage to the space capacitance, can be effectively stepped up, to thereby improve the power-supplying efficiency to the load, in comparison with the conventional electric power supply apparatus.

Also, if necessary, the electric power supply apparatus according to the present invention may further comprise: a transformer in which a primary voltage is stepped down, and in which a secondary voltage is output; and an inductance connected in parallel at the secondary side of said transformer to a secondary winding thereof, and the inductance connected in parallel to said capacitance corresponds to an excitation susceptance component of said transformer, said output section being at a secondary side of said transformer. With this arrangement, both the excitation susceptance and the inductance and the capacitance form the parallel resonance circuit, and thus it is possible to improve a current-entering efficiency to the load. Also, it is possible to make an impedance of the load to be larger at the primary side, and the primary voltage of the transformer, generated by a divided voltage to the space capacitance, can be effectively stepped up, to thereby improve the power-supplying efficiency to the load, in comparison with the conventional electric power supply apparatus. Especially, the inductance is connected to the secondary side of the transformer 1 featuring a low voltage, whereby the parallel resonance state can be maintained on the capacitance, the excitation susceptance and the inductance L without bulking the electric power supply apparatus, and without lowering the electric power obtained from the overhead power line.

Also, in the electric power supply apparatus according to the present invention, if necessary, the inductance connected in parallel at the secondary side of said transformer to the secondary winding thereof may be a variable inductance, and a value of said variable inductance is adjusted so that said parallel circuit is operated as the parallel resonance circuit. With this arrangement, it is unnecessary to previously select circuit parts of the inductance so that the requirements for the parallel resonance to the capacitance and the excitation susceptance are satisfied, and it is possible to accommodate the electric power supply apparatus to a variety of overhead power lines, to which the electric power supply apparatus should be attached. Especially, even if a length of the electrode is varied in accordance with a power consumption of the load, it is possible to obtain the requirements for the parallel resonance by adjusting a value of the variable inductance.

Also, in the electric power supply apparatus according to the present invention, if necessary, said electrode may be a tubular conductor by which a given length of said overhead line is enclosed. With this arrangement, it is possible to increase capacitances between the electrode concerned and the overhead power lines and ground, in comparison with a case where an electrode is formed as one suspended from the overhead power line through an insulator, or as a conductor coated with an insulating material, with it being directly and spirally wound around the overhead power line, resulting in increase of an electric power to be obtained at the load side.

Also, in the electric power supply apparatus according to the present invention, if necessary, said electrode may comprise a plurality of tubular conductors which have different diameters so that one of said tubular conductors is inserted into and abutted to another tubular conductor, and so that one of said tubular conductors is slidably received in another tubular conductor. With this arrangement, it is possible to adjust a length of the electrode in accordance with a power consumption of the load, and thus the compact electrode can be constructed, if necessary.

Further, in the electric power supply apparatus according to the present invention, if necessary, said electrode may be defined by connecting a plurality of tubular conductors to each other. With this arrangement, it is possible to adjust a length of the electrode in accordance with a power consumption of the load, and thus the compact electrode can be constructed, if necessary.

BRIEF EXPLANATIONS OF DRAWINGS

[FIG. 1] (*a*) is an explanatory view for explaining operation capacitance on overhead power lines of a three-phase system;

and (b) is a schematic arrangement view showing a state in which an overhead power line according to the first embodiment embodying the present invention is attached to an overhead power line.

Figure 2A:
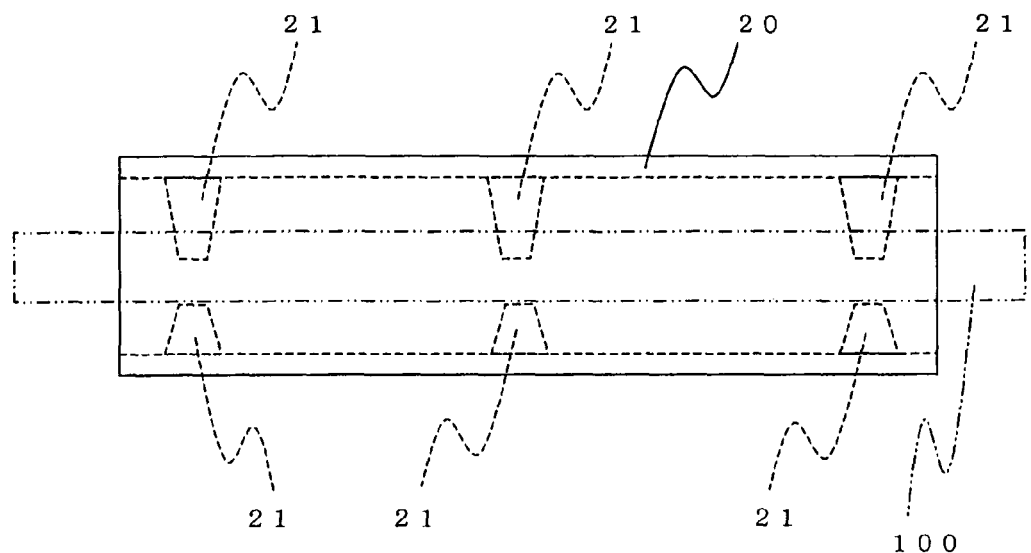

[FIG. 2] (a) is a side view showing an example of an electrode of the electric power supply apparatus shown in FIG. 1(a); and (b) is a front view of the electrode shown in FIG. 2(a).

Figure 1B:
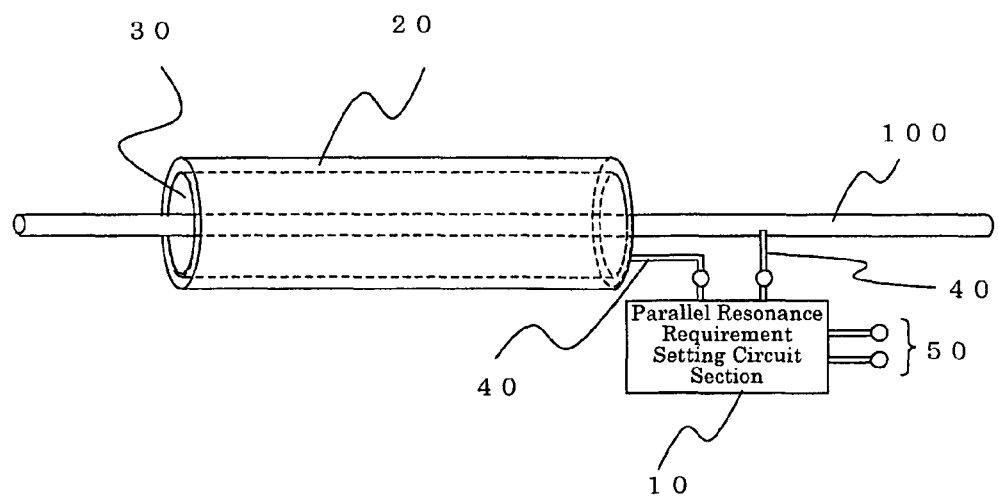

[FIG. 3] (a) is a front view showing another example of the electrode of the electric power supply apparatus shown in FIG. 1(b) before the electrode is attached to the overhead power line; and (b) is a front view showing the example concerned of the electrode of the electric power supply apparatus shown in FIG. 1(b) after the electrode is attached to the overhead power line.

[FIG. 4] (a) is a front view showing yet another example of the electrode of the electric power supply apparatus shown in FIG. 1(b) before the electrode is attached to the overhead power line; (b) a front view showing the example concerned of the electrode of the electric power supply apparatus shown in FIG. 1(b) after the electrode is attached to the overhead power line; and (c) is a front view showing still yet another example of the electrode of the electric power supply apparatus shown in FIG. 1(b) before the electrode is attached to the overhead power line.

Figure 5A:
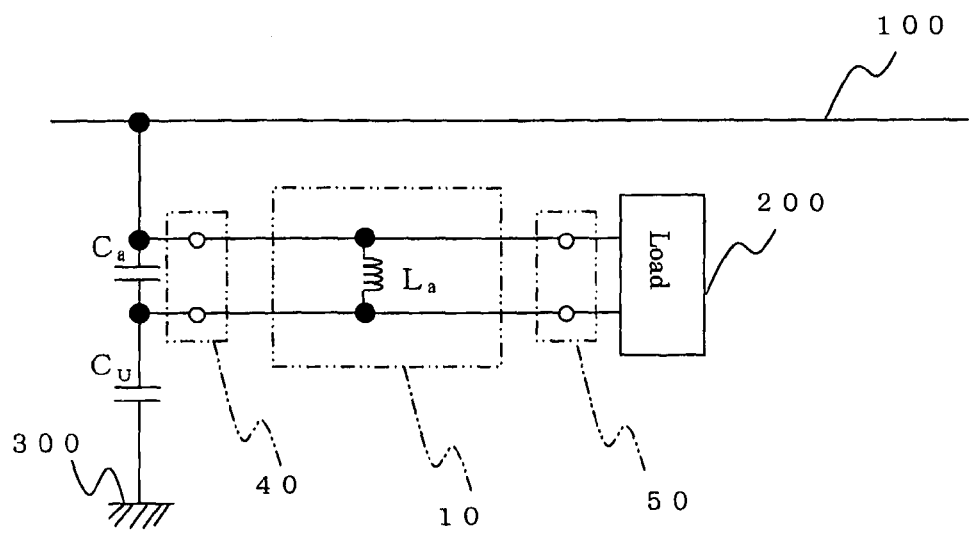

[FIG. 5] (a) is a circuit diagram showing an example of an equivalent circuit of the electric power supply apparatus shown in FIG. 1(b); and (b) is a circuit diagram showing an equivalent circuit shown in FIG. 5(a), in which a parallel circuit is resonated.

Figure 6A:
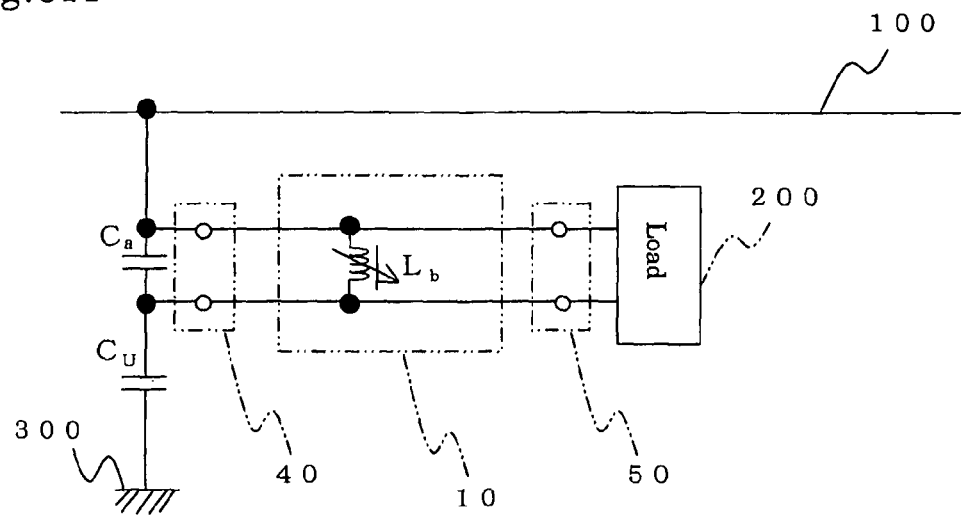
Figure 6B:
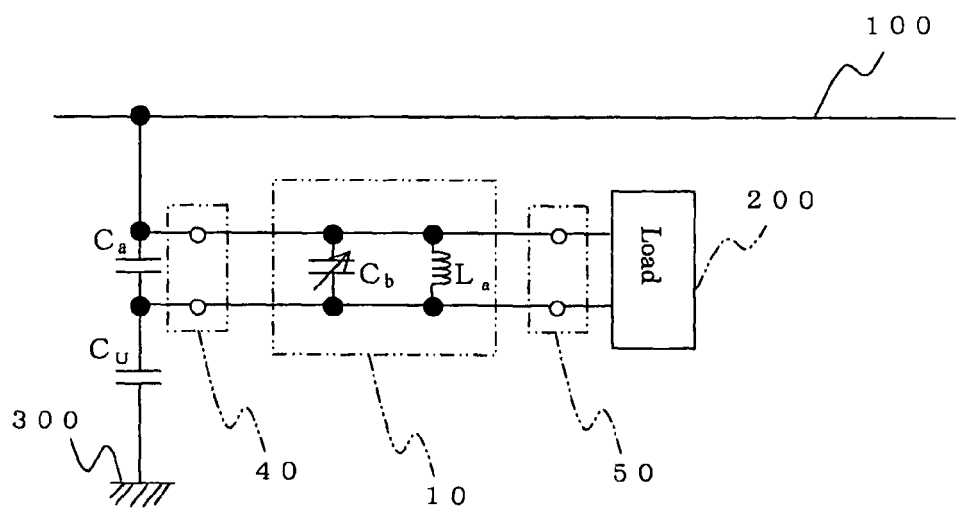
Figure 7A:
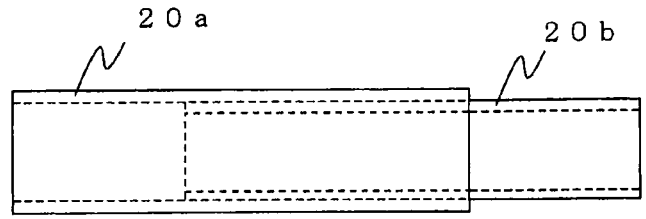
Figure 7B:
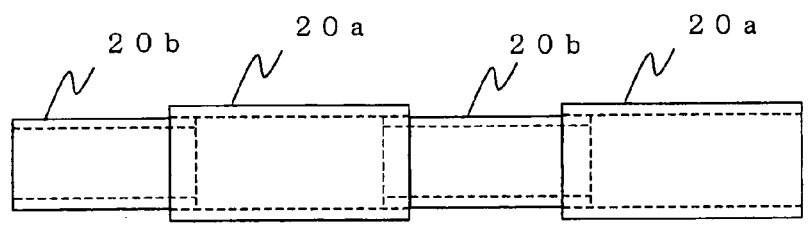
Figure 7C:
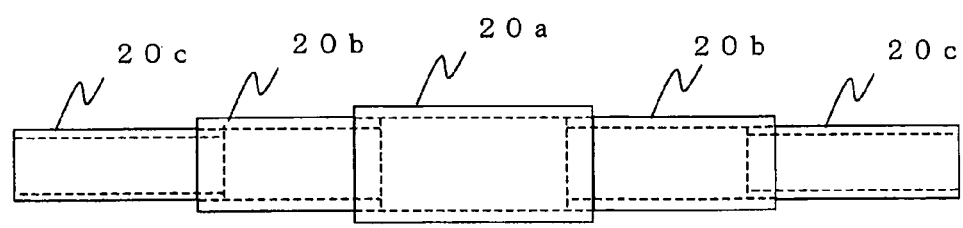
Figure 7D:
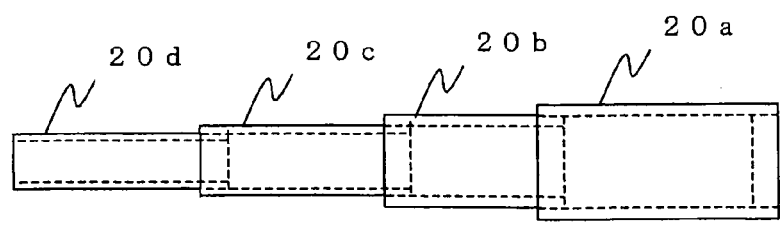

[FIG. 6] (a) is a circuit diagram showing another example of the equivalent circuit of the electric power supply apparatus shown in FIG. 1(b); and (b) is a circuit diagram showing yet another example of the equivalent circuit of the electric power supply apparatus shown in FIG. 1(b).

[FIG. 7] is a side view showing still yet another example of the electrode of the electric power supply apparatus shown in FIG. 1(b).

Figure 8A:
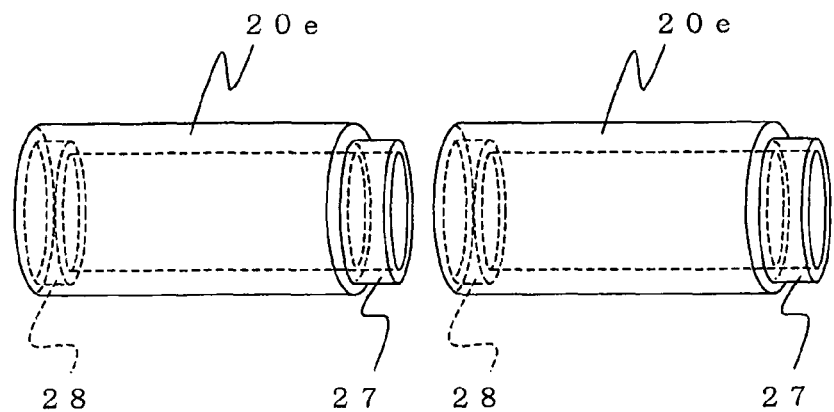

[FIG. 8] (a) is a perspective view showing still yet another example of the electrode of the electric power supply apparatus shown in FIG. 1(b); and (b) is a side view of the electrode shown in FIG. 8(a).

Figure 9A:
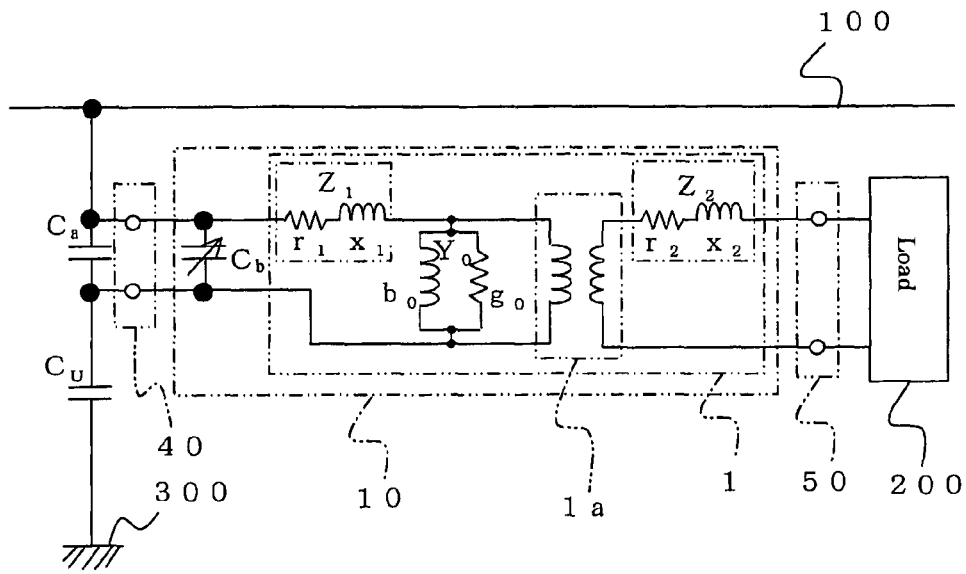

[FIG. 9] (a) is a circuit diagram showing an example of an equivalent circuit of the electric power supply apparatus shown in FIG. 1(b); and (b) is a circuit diagram showing the equivalent circuit shown in FIG. 9(a), in which a parallel circuit is resonated.

Figure 10A:
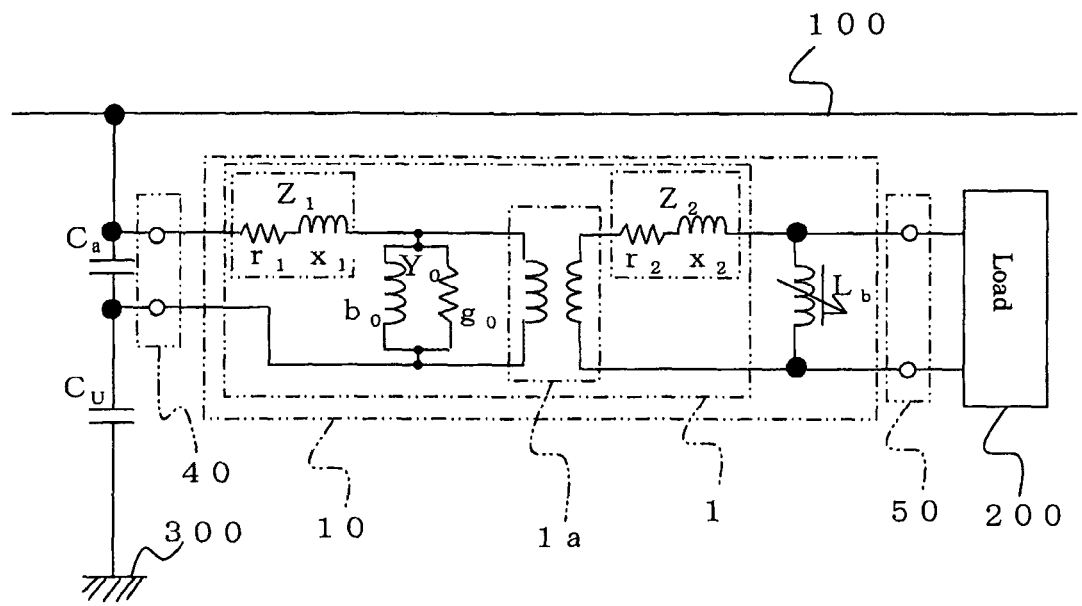

[FIG. 10] (a) is a circuit diagram showing an example of an equivalent circuit of the electric power supply apparatus shown in FIG. 1(b); and (b) is a circuit diagram showing the equivalent circuit shown in FIG. 10(a), in which a parallel circuit is resonated.

[FIG. 11] (a) is an explanatory view for explaining spatial capacitances on overhead power lines and an overhead linear conductor of a three-phase system; and (b) is a schematic arrangement view showing a state in which the electric power supply apparatus according to the fourth embodiment embodying the present invention is attached to the overhead linear conductor.

Figure 11A:
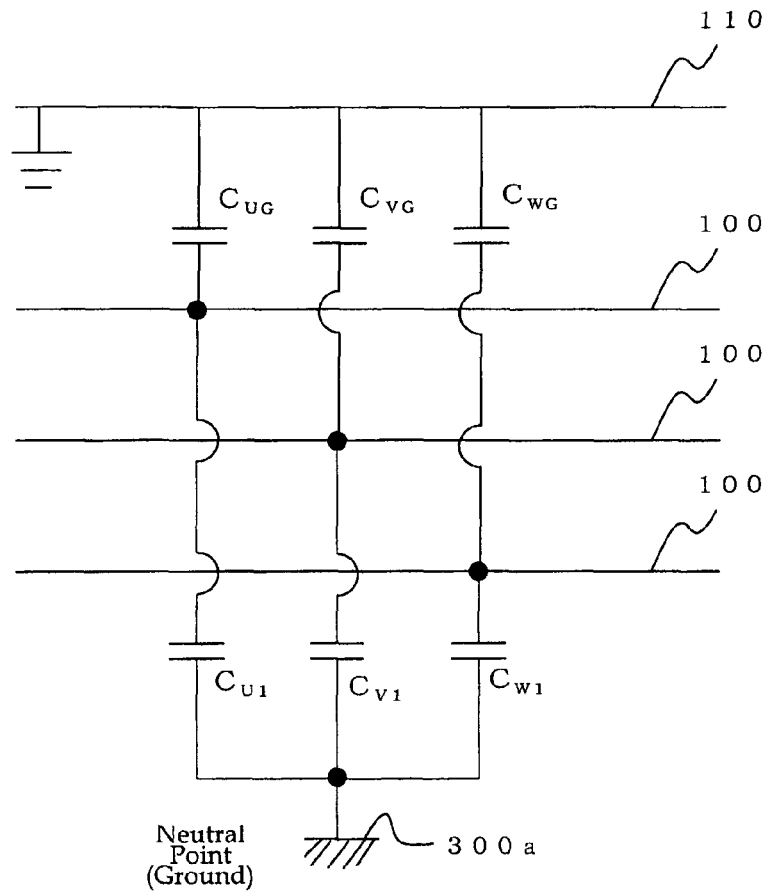
Figure 11B:
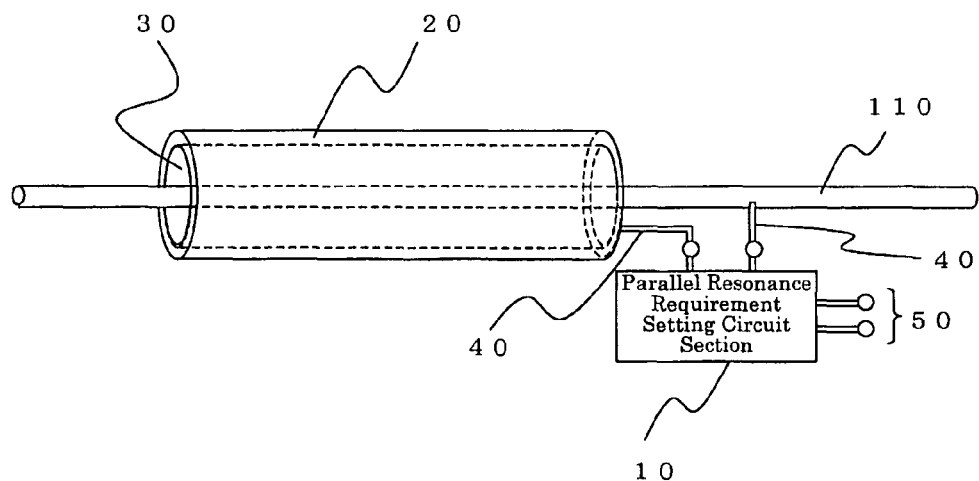
Figure 12A:
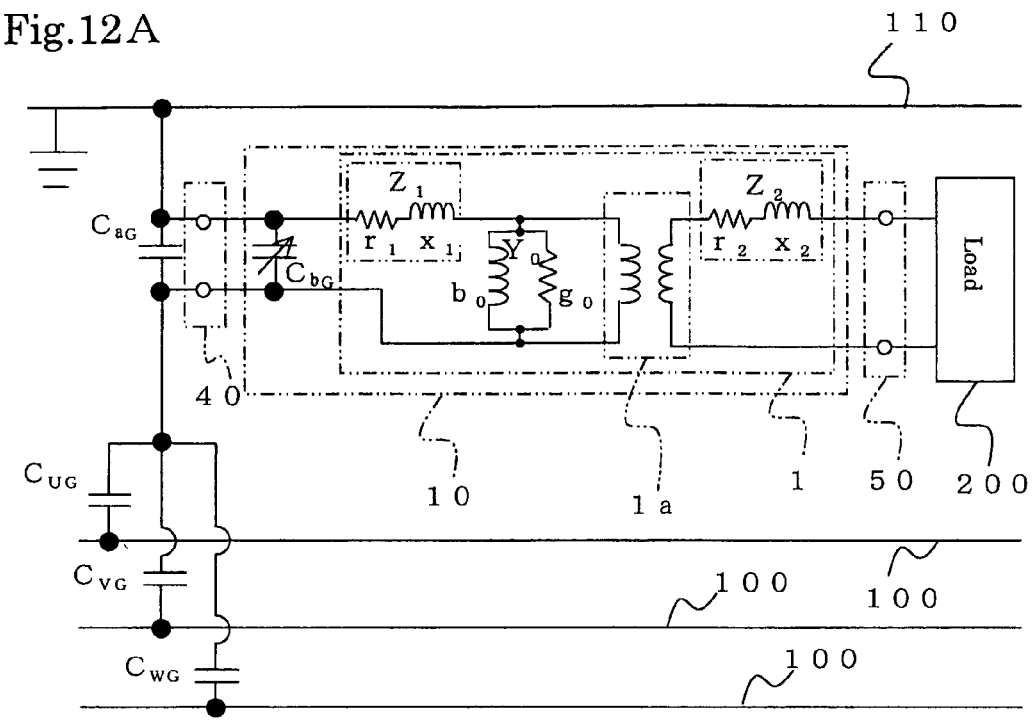

[FIG. 12] (a) is a circuit diagram showing an example of an equivalent circuit of the electric power supply apparatus shown in FIG. 11(b); and (b) is a circuit diagram showing the equivalent circuit shown in FIG. 12(a), in which a parallel circuit is resonated.

[FIG. 13] (a) is an equivalent circuit of a conventional night indicator device of an overhead power transmission line and a conventional electrostatic induction type electric power supply apparatus; and (b) is an equivalent circuit of a conventional electric power supply apparatus for a measurement device of a power transmission/distribution system.

EXPLANATION OF REFERENCES

1 Transformer
1a Ideal Transformer
10 Parallel Resonance Requirement Setting Circuit Section
20 Electrode
20a Tubular Conductor
20b Tubular Conductor
20c Tubular Conductor
21 Protrusion
22 Slit
23 Engagement Portion
24 Thin Portion
25 Recess Portion
26 Taper Portion
27 Projection
28 Recess
30 Dielectric
40 Input Section
50 Output Section
100 Overhead Power Line
100a Power Transmission Line
100b Power Transmission/Distribution Line
200 Load
300 Ground
300a Neutral Point (Ground)

THE BEST MODE FOR EMBODYING THE INVENTION (First Embodiment of Present Invention)

Figure 2B:
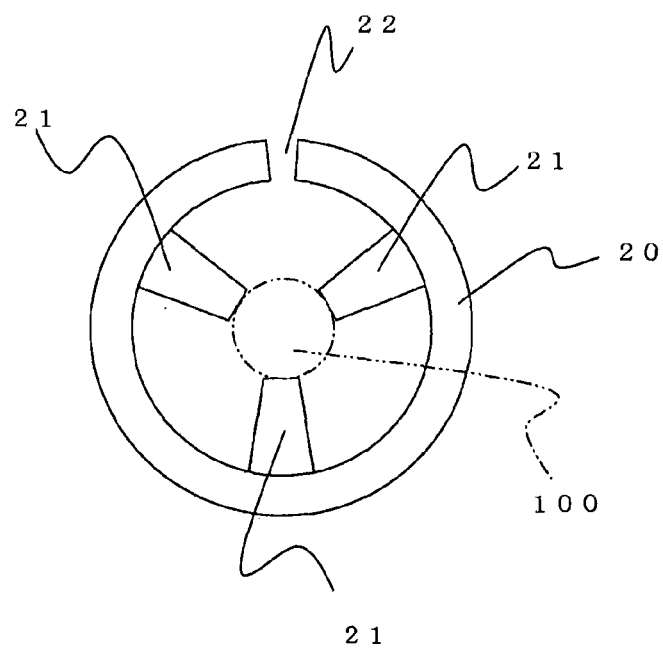
Figure 3A:
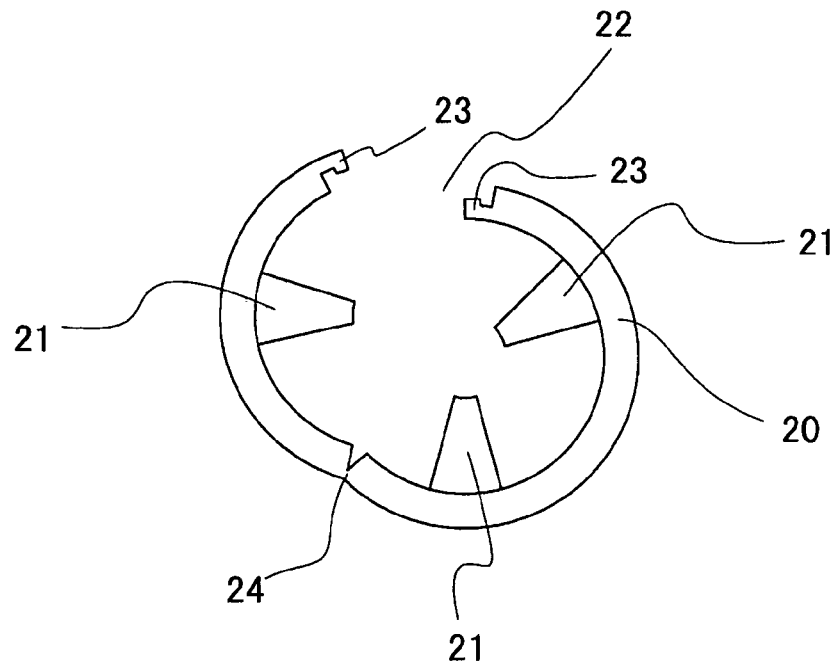
Figure 3B:
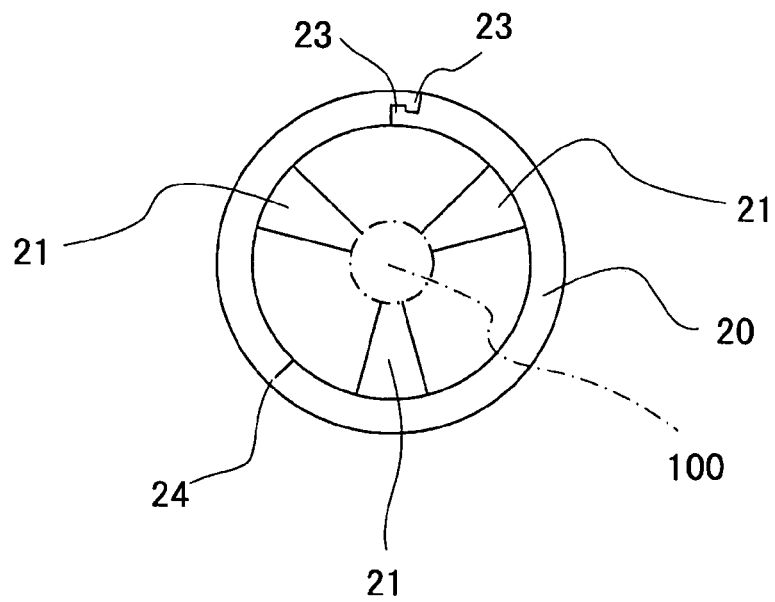
Figure 4A:
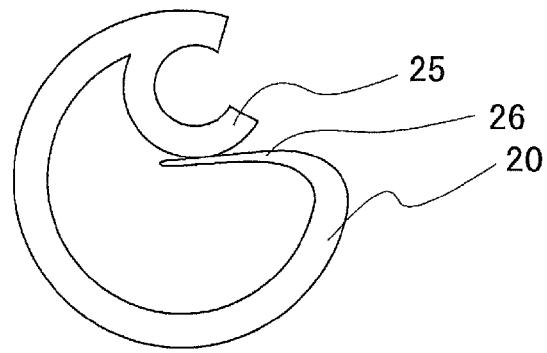
Figure 4B:
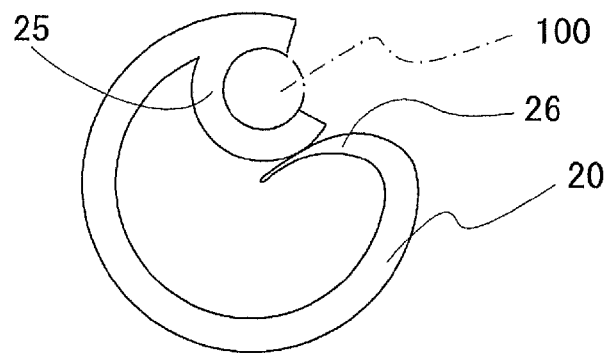
Figure 4C:
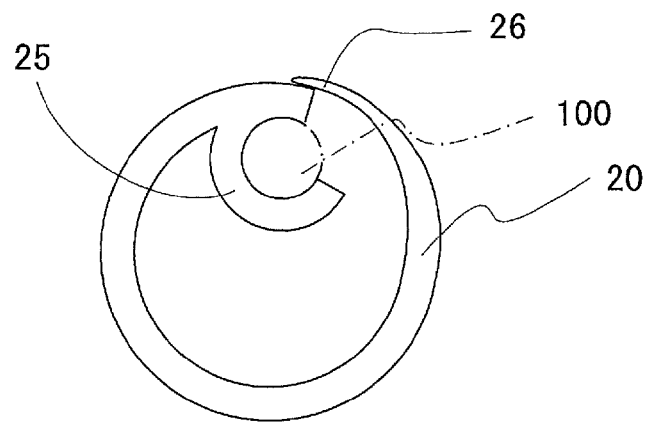
Figure 5B:
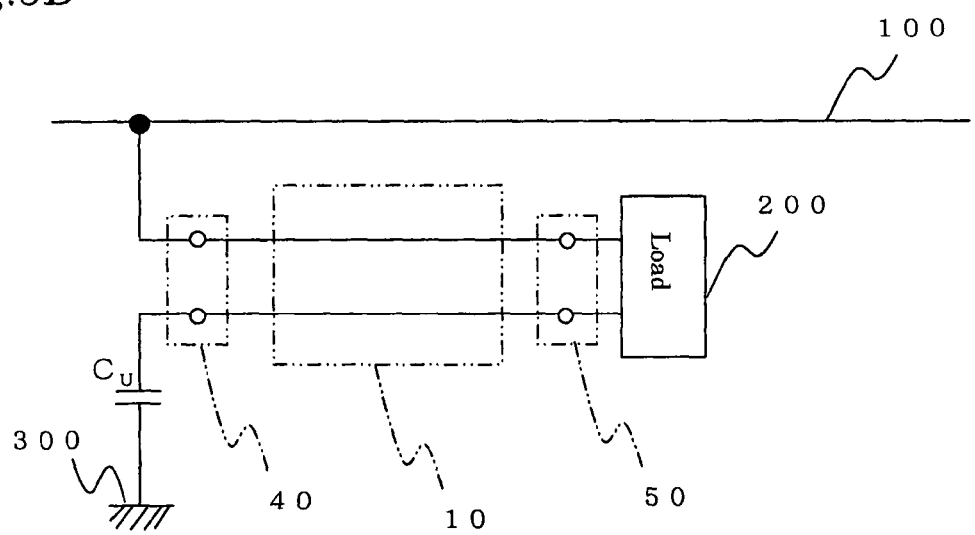

FIG. 1(a) is an explanatory view for explaining operation capacitances on overhead power lines of a three-phase system; FIG. 1(b) is a schematic arrangement view showing a state in which the electric power supply apparatus according to the first embodiment embodying the present invention is attached to an overhead power line; FIG. 2(a) is a side view showing an example of an electrode of the electric power supply apparatus shown in FIG. 1(b); FIG. 2(b) is a front view of the electrode shown in FIG. 2(a); FIG. 3(a) is a front view showing another example of the electrode of the electric power supply apparatus shown in FIG. 1(b) before the electrode is attached to the overhead power line; FIG. 3(b) is a front view showing the example concerned of the electrode of the electric power supply apparatus shown in FIG. 1(b) after the electrode is attached to the overhead power line; FIG. 4(a) is a front view showing yet another example of the electrode of the electric power supply apparatus shown in FIG. 1(b) before the electrode is attached to the overhead power line; FIG. 4(b) is a front view showing the example concerned of the electrode of the electric power supply apparatus shown in FIG. 1(b) after the electrode is attached to the overhead power line; FIG. 4(c) is a front view showing still yet another example of the electrode of the electric power supply apparatus shown in FIG. 1(b) before the electrode is attached to the overhead power line; FIG. 5(a) is a circuit diagram showing an example of an equivalent circuit of the electric power supply apparatus shown in FIG. 1(b); FIG. 5(b) is a circuit diagram showing the equivalent circuit shown in FIG. 5(a), in which a parallel circuit is resonated; FIG. 6(a) is a circuit diagram showing another example of the equivalent circuit of the electric power supply apparatus shown in FIG. 1(b); FIG.

Figure 8B:
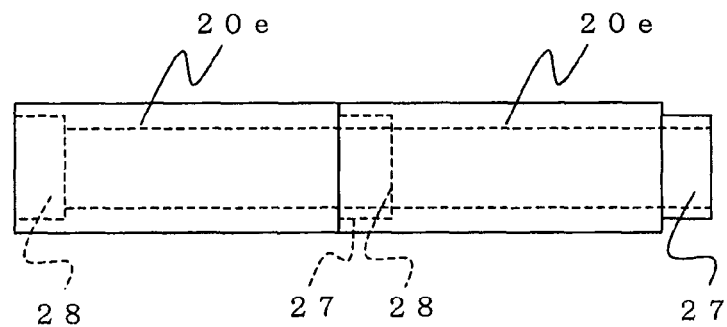

6(b) is a circuit diagram showing yet another example of the equivalent circuit of the electric power supply apparatus shown in FIG. 1(b); FIG. 7 is a side view showing still yet another example of the electrode of the electric power supply apparatus shown in FIG. 1(b); FIG. 8(a) is a perspective view showing still yet another example of the electrode of the electric power supply apparatus shown in FIG. 1(b); and FIG. 8(b) is a side view of the electrode shown in FIG. 8(a).

In FIG. 1(a), overhead power lines 100 are respective power lines of a three-phase system in an aerial conductor wire road, there are capacitances between the power lines of the three-phase system and between the power lines and the ground. These capacitances are handled and converted into capacitances operating between the power lines and a neutral point (ground) 300a of the three-phase system, to thereby obtain operation capacitances $C_U$, $C_V$ and $C_W$.

Next, an explanation is made on a case where an electrode 20 of the electric power supply apparatus according to the present invention is attached to the U-phase overhead power line 100.

In FIG. 1(b), the electric supply apparatus according to the present invention includes: the electrode 20 which longitudinally extends along the overhead power line 100 so that a dielectric 30 composed of air and so on is intervened therebetween; a parallel resonance requirement setting circuit section 10 which has an capacitance C derived from the dielectric intervened between the overhead power line 100 and the electrode 20; an input section 40 which includes lead lines or the like connected to the overhead power line 100, using a not shown instrument (for example, a pin type clamp) or the like, by which one terminal of an input side of the parallel resonance requirement setting circuit section 10 is connected to the electrode 20, and by which another terminal thereof is connected to a conductor of the overhead power line 100; and an output section 50 which is an output side of the parallel resonance requirement setting circuit section 10, and which includes cables or the like connected to a load 200 to supply an electric power to the load.

As shown in FIG. 2, the electrode 20 is a tubular conductor surrounding a given length of the overhead power line 100, has protrusions 21 for holding the overhead power line 100 at a general center position in a cross section of the tubular conductor which is cut perpendicular to the longitudinal direction of the tubular conductor, and has a slit 22 extending in the longitudinal direction of the tubular conductor to thereby introduce the overhead power line 100 into the interior of the tubular conductor. If the tubular conductor is formed as a metal pipe without the slit 22, it is necessary to cut the overhead power line 100 in order to introduce the overhead power line 100 into the metal pipe. Nevertheless, due to the slit, the attachment of the tubular conductor to the overhead power line 100 can be easily carried out without cutting the overhead power line 100.

Note that the shape and the number of the protrusions 21 of the electrode 20 are not limited as long as the overhead power line 100 can be surely held.

Also, as a substitute for the slit 22 for introducing the overhead power line 100 into the interior of the tubular conductor, the tubular conductor maybe formed of two cylindrical members, so that the overhead power line 100 is griped by the opposed cylindrical members.

Further, as shown in FIG. 3, the electrode 20 may have engagement portions 23 by which peripherally-opposed ends of the tubular conductor can be snugly engaged with each other, and a thin portion 24 extending in the longitudinal direction of the tubular conductor so that the tubular conductor can be bent so as to open and close the slit 22.

Note, in the attachment procedure of the electrode 20 shown in FIG. 3 to the overhead power line 100, the overhead power line 100 is abutted against the protrusions 21 (herein, the two protrusions 21) while the slit 22 is opened (FIG. 3(a)), and then the bent state of the tubular conductor is restored so as to close the slit 22, to thereby engage the engagement portions 23 with each other (FIG. 3(b)).

Further, as shown in FIG. 4, the electrode 20 may have a recess portion 25 provided at one of peripheral ends of the tubular conductor to receive the overhead power line 100, a taper portion 26 provided at the other end thereof, a thickness of the taper portion 26 becoming gradually smaller toward a tip thereof.

Note, in the attachment procedure of the electrode 20 shown in FIG. 4 to the overhead power line 100, the taper portion 26 is bent inside the tubular conductor to the recess portion 25 (FIG. 4(a)), and the overhead power line 100 is received in the recess portion 25 (FIG. 4(b)). Then, the bent state of the tubular conductor is restored so that the taper portion 25 is positioned outside the tubular conductor to the recess portion 25 (FIG. 4(c)).

Also, the electrode 20 is not limited to this shape. The electrode may be formed as one suspended from the overhead power line 100 through an insulator, or as a conductor coated with an insulating material, with it being directly and spirally wound around the overhead power line 100.

Further, as long as a charge is stored in an operation capacitance $C_U$, a material of the electrode 20 is not limited to a metal such as aluminum and so on, and a conductive synthetic resin or a semi-conductive synthetic resin may be used for the electrode. Note that, in this first embodiment, the tubular conductor formed of semi-conductive polyethylene and having a length of 2.5 m is used. Especially, when the overhead power line 100 has an insulation coating, and when a voltage resistance performance is asked, it is necessary to give an insulation coating, equivalent to the line, to the surfaces of the electric power supply apparatus including the electrode 20 and the surfaces of the load 200.

For example, as shown in FIG. 5(a), the parallel resonance requirement setting circuit section 10 comprises an inductance $L_a$ which is connected in parallel between a load 200 and a capacitance $C_a$ derived from the dielectric between the overhead power line 100 and the electrode 20, and which is resonated in parallel with the capacitance $C_a$.

Note, when a kind of the overhead power line 100, to which the electric power supply apparatus is attached, and specifications of the electrode 20 and the dielectric 30 are determined, and when a value of the capacitance $C_a$ is fixed, circuit parts are selected so that requirements for the parallel resonance between the inductance $L_a$ and the capacitance $C_a$ are satisfied.

With this arrangement, the capacitance $C_a$ and the inductance $L_a$ are resonated in parallel with each other, and thus both the currents thereof are compensated with each other so that a synthetic impedance of both the capacitance $C_a$ and the inductance $L_a$ is maintained to be infinite ($\infty$). As a result, as shown in FIG. 5(b), the capacitance $C_a$ and the inductance $L_a$ can be omitted from the circuit concerned, and it can be regarded as an equivalent circuit in which the load 200 and the operation capacitance $C_U$ are connected in series to each other.

Accordingly, in the conventional electric power supply apparatus, at the parallel section of both the load 200 and the capacitance $C_X$, the current flowing through the circuit separates into two parts which are directed to the load 200 and the capacitance $C_X$, respectively, and thus a portion of the current flows into the capacitance ($C_X$ of the insulating material)

formed of an insulating material. In contrast, in the electric power supply apparatus according to the present invention, all the current flows into the load 200, and thus the electric power supply apparatus features a superior current-entering efficiency to the load 200.

Also, for example, as shown in FIG. 6(*a*), the parallel resonance requirement setting circuit section 10 may comprise a circuit arrangement including a variable inductance $L_a$ which is connected in parallel between the capacitance $C_a$ and the load 200, and a value of which can be adjusted so that the variable inductance $L_a$ is resonated in parallel with the capacitance $C_a$.

Namely, since the parallel circuit including the capacitance $C_a$ and the variable inductance $L_a$ can be changed into a parallel resonance circuit by adjusting a value of the variable inductance $L_a$, it is unnecessary to previously select circuit parts of the inductance $L_a$ so that the requirements for the parallel resonance to the capacitance $C_a$ are satisfied, and it is possible to accommodate the electric power supply apparatus to a variety of overhead power lines 100, to which the electric power supply apparatus should be attached. Especially, even if a length of the electrode 20 is varied in accordance with a power consumption of the load 200, it is possible to obtain the requirements for the parallel resonance by adjusting a value of the variable inductance $L_a$.

Note, in order to obtain the parallel resonance state on the capacitance $C_a$ and the variable inductance $L_a$, while a value of the variable inductance $L_a$ is varied, a voltage of the output section 50 is measured. When a measured voltage indicates the maximum value, the desirable parallel resonance state is obtained. Also, as a substitute for the variable inductance $L_a$, a semi-fixed inductance may be used. An adjustment of the semi-fixed inductance is only once carried out when the electric power supply apparatus is attached to the overhead power line 100, with an alteration of the semi-fixed inductance being not carried out thereafter.

Also, for example, as shown in FIG. 6(*b*), the parallel resonance requirement setting circuit section 10 may comprise a circuit arrangement including a variable capacitance $C_b$ and an inductance $L_a$ connected in parallel with respect to the capacitance $C_a$.

Namely, since the parallel circuit including the capacitance $C_a$, the variable capacitance $C_b$, and the inductance $L_a$ can be changed into a parallel resonance circuit by adjusting a value of the variable capacitance $C_b$, it is unnecessary to previously select circuit parts of the inductance $L_a$ so that the requirements for the parallel resonance to the capacitance $C_a$ are satisfied, and it is possible to accommodate the electric power supply apparatus to a variety of overhead power lines 100, to which the electric power supply apparatus should be attached. Especially, even if a length of the electrode 20 is varied in accordance with a power consumption of the load 200, it is possible to obtain the requirements for the parallel resonance by adjusting a value of the variable capacitance $C_b$.

Note, in order to obtain the parallel resonance state on the capacitance $C_a$, the variable capacitance $C_b$ and the inductance $L_a$, while a value of the variable capacitance $C_b$ is varied, a voltage of the output section 50 is measured. When a measured voltage indicates the maximum value, the desirable parallel resonance state is obtained. Also, as a substitute for a variable capacitor forming the variable inductance $L_a$, a semi-fixed capacitor may be used. An adjustment of the semi-fixed capacitor is only once carried out when the electric power supply apparatus is attached to the overhead power line 100, with an alteration of the semi-fixed capacitor being not carried out thereafter.

Also, in this first embodiment, although the explanation is made on the case where the electrode 20 comprises one tubular conductor, the electrode 20 comprises a plurality of tubular conductors which have different diameters so that one of the tubular conductors can be inserted into and abutted to another tubular conductor, and so that one of the tubular conductors can be slidably received in another tubular conductor. For example, as shown in FIG. 7, a plurality of tubular conductors 20*a*, 20*b*, 20*c* and 20*d* having different diameters are suitably selected and are combined.

With this arrangement, it is possible to adjust a length of the electrode 20 in accordance with a power consumption of the load 200, and thus the compact electrode 20 can be constructed, if necessary.

Similarly, as shown in FIG. (8), the electrode 20 is formed by connecting tubular conductors 20*e*, each having a projection 27 formed at one end, and a recess 28 formed at the other end, to each other such that a projection 27 of one tubular conductor is inserted into a recess 28 of another tubular conductor. With this arrangement, it is possible to adjust a length of the electrode 20 in accordance with a power consumption of the load 200, and thus the compact electrode 20 can be constructed, if necessary.

(Second Embodiment of Present Invention)

FIG. 9(*a*) is a circuit diagram showing an example of an equivalent circuit of the electric power supply apparatus shown in FIG. 1(*b*); and FIG. 9(*b*) is a circuit diagram showing the equivalent circuit shown in FIG. 9(*a*), in which a parallel circuit is resonated. In FIG. 9, the same references as in FIGS. 1 to 8 indicate the same or corresponding elements, and explanations of these elements are omitted.

This second embodiment is different from the first embodiment only in that a transformer 1 is connected in parallel between a capacitance $C_a$ and a load 200, and has the similar functions and effects to those of the first embodiment except for below-mentioned functions and effects obtained from the transformer 1.

By the transformer 1, a primary voltage, which is input to an input section 40 of a parallel resonance requirement setting circuit section 10, is stepped down, and then the stepped-down voltage is output from an output section to a load side. Note, in this second embodiment, although, in the transformer 1, a turn ratio ($N_1/N_2$) of a winding number $N_1$ of a primary winding to a winding number $N_2$ of a secondary winding is 100, the turn ratio is not limited to only 100.

In this transformer 1, when it is presumed 1) that all a magnetic flux passes through an iron core, and intersects with both the windings; 2) that a resistance of the windings is ignorable; 3) that an iron loss is ignorable; 4) that a saturation of the iron core is ignorable; and 5) that a magnetic permeability of the iron core is infinite, a magnetizing current being ignorable, it can be regarded as an ideal transformer 1*a*.

In the ideal transformer 1*a*, although it is presumed that all the magnetic flux passes through the iron core, and intersects with both the windings, in the real transformer 1, in addition to a major magnetic flux intersecting with both the primary winding and the secondary winding, there are a magnetic flux intersecting with only the primary winding, and not intersecting with the secondary winding; and a magnetic flux intersecting with only the secondary winding, and not intersecting with the primary winding, and these magnetic fluxes are referred to as a leakage flux.

An electromotive force based on the leakage flux can be handled as a reactance voltage drop caused by an inductance connected in series to the primary winding and the secondary winding of the ideal transformer 1*a* which is free from the leakage flux. Accordingly, when a primary leakage reactance and a secondary leakage reactance are defined as $x_1$ and $x_2$, respectively, as shown in FIG. 9(a), these influences may be represented as the leakage reactance $x_1$ and the leakage reactance $x_2$, which are respectively connected in series to the primary winding and the secondary winding of the ideal transformer 1a.

Also, in the ideal transformer 1a, although it is presumed that the resistance of the windings is ignored, in the real transformer, the windings have the resistance, and thus a voltage drop and a copper loss are involved. Accordingly, when a resistance of the primary winding and a resistance of the secondary winding are defined as $r_1$ and $r_2$, respectively, as shown in FIG. 9(a), these influences may be represented as the resistance $r_1$ and the resistance $r_2$, which are respectively connected in series to the primary winding and the secondary winding of the ideal transformer 1a.

In order that a combined coil of the primary and secondary coils is formed as the ideal transformer 1a, as shown in FIG. 9(a), it is necessary to provide a path of the magnetizing current in parallel to the primary coil. This shunt includes a parallel circuit of an excitation conductance $g_0$ forming a path of an iron loss current and an excitation susceptance $b_0$ forming a path of a magnetizing current.

Thus, as shown in FIG. 9(a), the transformer 1 can be represented by an equivalent circuit including the resistance $r_1$ of the primary winding, the primary leakage reactance $x_1$, the excitation susceptance $b_0$, the excitation conductance $g_0$, the ideal transformer 1a, the resistance $r_2$ of the secondary winding and the leakage reactance $x_2$.

Also, in the transformer 1, a synthetic impedance $Z_1$ composed of the resistance $r_1$ of the primary winding and the primary leakage reactance $x_1$, and a synthetic impedance $Z_2$ composed of the resistance $r_2$ of the secondary winding and the secondary leakage reactance $x_2$ cause small voltage drops, but these voltage drops are generally very small, and thus are ignorable because the voltage drops do not exert a large influence on the circuit.

Figure 9B:
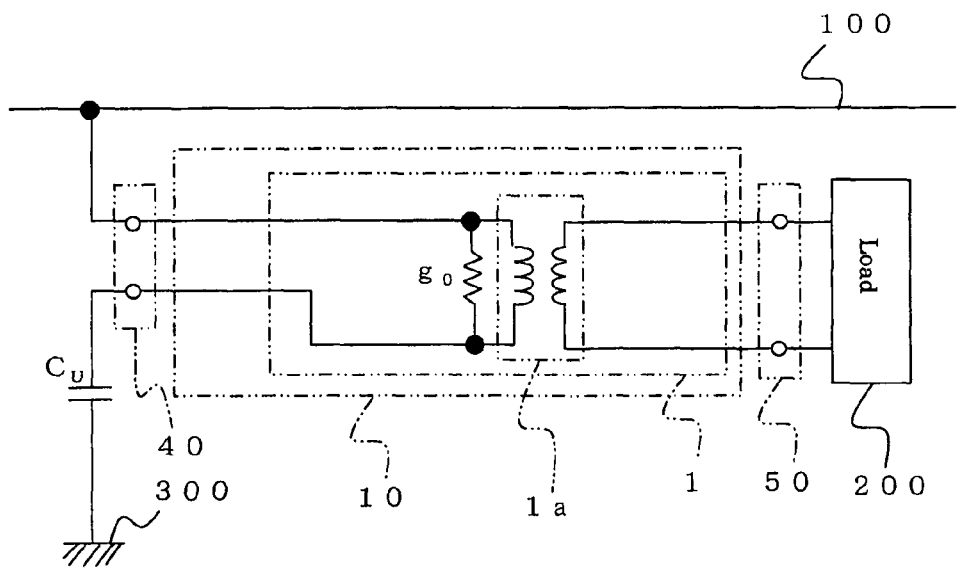

Also, a variable capacitance $C_b$ is adjusted so that a parallel resonance state is created on the capacitance $C_a$ and variable capacitance $C_b$ and the excitation susceptance $b_0$, and thus both the currents thereof are compensated with each other so that a synthetic impedance of the capacitance $C_a$, the variable capacitance $C_b$ and the excitation susceptance $b_0$ is maintained to be infinite ($\infty$). As a result, as shown in FIG. 9(b), the circuit concerned can be regarded as a simple equivalent circuit.

Note, in order to obtain the parallel resonance state on the capacitance $C_a$, the variable capacitance $C_b$ and the excitation susceptance $b_0$, while a value of the variable capacitance $C_b$ is varied, a voltage of the primary side or secondary side of the transformer 1, or a voltage of the output section 50 is measured. When a measured voltage indicates the maximum value, the desirable parallel resonance state is obtained. Especially, it is preferable to gradually vary the value of the variable capacitance $C_b$ by opening and closing a switch by a not shown central processing unit (CPU), so that the measured voltage is obtained as the maximum value. In a case where an change of the capacitance $C_a$ is small due to a kind of the overhead power line 100 or due to an arrangement of the electrode 20, by selecting a the excitation susceptance $b_0$, it is possible to substitute a fixed capacitance for the variable capacitance $C_b$ or to omit the variable capacitance $C_b$.

Herein, it is assumed that, in the transformer 1, a turn ratio ($N_1/N_2$) of a winding number $N_1$ of a primary winding to a winding number $N_2$ of a secondary winding is 100, and that the load of 1 k$\Omega$ is connected to the output section 50 of the electric power supply apparatus.

In this case, an impedance of the load 200 at the primary side is the square of the turn ratio, i.e., 10 M$\Omega$ (=1 k$\Omega \times 100^2$), which is very large.

Namely, due to the impedance match based on the transformer 1, the impedance of 1 k$\Omega$ of the load 200 is converted into the impedance of 10 M$\Omega$.

Also, there is the excitation conductance $g_0$ on the primary side of the transformer 1, and this value is very small (it is very large as the resistance).

Accordingly, a synthetic impedance of the parallel circuit composed of the impedance of the load 200 and the excitation conductance $g_0$ at the primary side has a large value. Although it is a divided voltage to an operation capacitance $C_U$, a large voltage is applied to the primary side of the transformer 1.

Note, in a case where the transformer 1 is formed as a single transformer, the excitation conductance $g_0$ is relatively small. For this reason, it is necessary to increase the winding number of the primary winding while maintaining the turn ratio of the transformer 1 at a desirable value. As a result, a shape of the transformer 1 becomes too large, which may be a hindrance in attachment of the electric power supply apparatus to the overhead power line 100. In addition, since it is necessary to use a specific material featuring a small iron loss for the core, resulting in an increase in cost of the transformer.

So, by disposing a plurality of small transformers suitable for a mass-production side by side along the overhead power line 100 in a longitudinal direction thereof, and by connecting them in series to each other, it is possible to compactly form the electric power supply apparatus at low cost, and it is possible to make the excitation conductance $g_0$ to be small while maintaining the turn ratio constant. Note, in this first embodiment. Note, in this first embodiment, the transformer 1 is formed of eight transformers connected in series to each other.

As stated above, in the electric power supply apparatus according to the present invention, the parallel resonance state is created on the excitation susceptance $b_0$ of the transformer 1 and both the capacitance $C_a$ and the variable capacitance $C_b$ disposed in parallel to the excitation susceptance $b_0$, so that a synthetic impedance thereof is maintained to be infinite ($\infty$). As a result, not only can high voltages be generated at the excitation conductance $g_0$, the ideal transformer 1a and the load 200, but also the current flowing at the side of the capacitance $C_a$ is compensated, so that it is possible to improve an current-entering efficiency to the load 200. Also, due to the impedance match based on the transformer 1, it is possible to apply a large voltage to the load 200.

Especially, in the electric power supply apparatus according to the present invention, since the parallel resonance requirement setting circuit section 10 comprises a simple circuit arrangement including only the variable capacitance $C_b$ and the transformer 1 as circuit elements, the electric power supply apparatus has a practical size and weight as one to be attached to the overhead power line. Further, when the load 200 is a device featuring a small power consumption, such as a measurement device and so on, it is possible to continuously supply the electric power to the load.

(Third Embodiment of Present Invention)

Figure 10B:
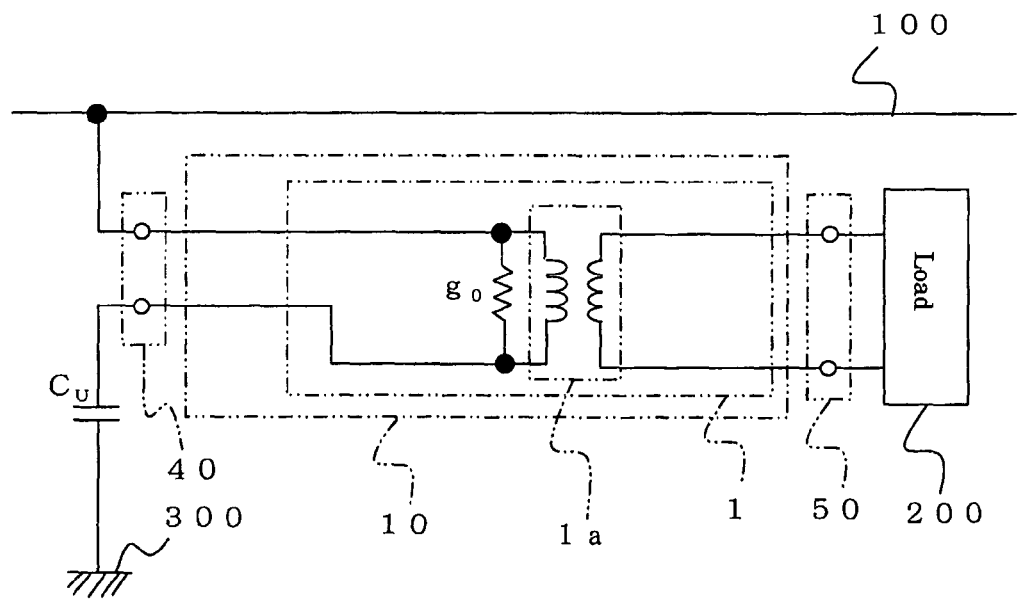

FIG. 10(a) is a circuit diagram showing an example of an equivalent circuit of the electric power supply apparatus shown in FIG. 1(b); and FIG. 10(b) is a circuit diagram showing the equivalent circuit shown in FIG. 10(a), in which a parallel circuit is resonated. In FIG. 10, the same references as in FIGS. 1 to 9 indicate the same or corresponding elements, and explanations of these elements are omitted.

This third embodiment is different from the second embodiment only in that a variable inductance $L_b$ is connected in parallel between a secondary winding of a transformer 1 and a load 200 as a substitute for connecting a variable capacitance $C_b$ to a primary winding of the transformer 1, and has the similar functions and effects to those of the second embodiment except for below-mentioned functions and effects obtained from the variable inductance $L_b$.

A value of the variable inductance $L_b$ is adjusted so that a parallel resonance state is created on a capacitance $C_a$, an excitation susceptance $b_0$ and the variable inductance $L_b$, and thus both the currents thereof are compensated with each other so that a synthetic impedance of the capacitance $C_a$, the excitation susceptance $b_0$ and the variable inductance $L_b$ is maintained to be infinite ($\infty$). As a result, as shown in FIG. 10(b), the circuit concerned can be regarded as a simple equivalent circuit.

Note, in order to obtain the parallel resonance state on the capacitance $C_a$, the excitation susceptance $b_0$ and the variable inductance $L_b$, while a value of the variable inductance $L_b$ is varied, a voltage of the primary side or secondary side of the transformer 1, or a voltage of the output section 50 is measured. When a measured voltage indicates the maximum value, the desirable parallel resonance state is obtained. Especially, it is preferable to gradually vary the value of the variable inductance $L_b$ by opening and closing a switch by a not shown central processing unit (CPU), so that the measured voltage is obtained as the maximum value. In a case where an change of the capacitance $C_a$ is small due to a kind of the overhead power line 100 or due to an arrangement of the electrode 20, by selecting a the excitation susceptance $b_0$, it is possible to substitute a fixed inductance for the variable inductance $L_b$ or to omit the variable inductance $L_b$.

Herein, an explanation is made on a function and effect obtained from the fact that the variable inductance $L_b$ or the fixed inductance $L_a$ is connected to the secondary side of the transformer 1.

First, in FIG. 10(a), in the system of the transformer 1 in which the variable inductance $L_b$ is not connected, before an iron loss current flowing the excitation susceptance $b_0$ can be made to be small, it is necessary to increase the winding number of the primary winding to thereby make a value of the excitation susceptance $b_0$ to be small (to make a value of resistance to be large).

In this case, the increase of the winding number of the primary winding result in making an inductance of the excitation susceptance $b_0$ to be large, and thus it is necessary to make the capacitance $C_a$ to be small in order to maintain the parallel resonance state on the capacitance $C_a$ and the excitation susceptance $b_0$.

Namely, before the capacitance $C_a$ can be made to be small, it is necessary to make the surface of the electrode 20 to the overhead power line to be small (e.g., to shorten the tubular conductor) or it is necessary to expand a space between the overhead power line 100 and the electrode 22 (e.g., to increase the inner diameter of the tubular conductor).

Nevertheless, to make the surface of the electrode 20 to the overhead power line to be small (e.g., to shorten the tubular conductor) causes a problem that an electric power obtained from the overhead power line 100 declines. Also, to expand a space between the overhead power line 100 and the electrode 22 (e.g., to increase the inner diameter of the tubular conductor) causes a problem that the electric power supply apparatus bulks.

On the other hand, although it is considered that an inductance L (a variable inductance $L_b$ or a fixed inductance $L_a$) is connected in parallel between the capacitance $C_a$ and the primary winding of the transformer 1 in order to make a synthetic inductance of the inductance L and the excitation susceptance $b_0$ to be small, an addition of the inductance, which can resist a high voltage applied to the primary side of the transformer, causes a problem that the electric power supply apparatus bulks.

Thus, in the electric power supply apparatus according to the present invention, the inductance L is connected to the secondary side of the transformer 1 featuring a low voltage, whereby it is possible to obtain a function and effect that the parallel resonance state can be maintained on the capacitance $C_a$, the excitation susceptance $b_0$ and the inductance L (the variable inductance $L_b$ or the fixed inductance $L_a$) without bulking the electric power supply apparatus, and without lowering the electric power obtained from the overhead power line 100.

As stated above, in the electric power supply apparatus according to the present invention, the parallel resonance state is created on the capacitance $C_a$ and both the excitation susceptance $b_0$ of the transformer 1 and the variable inductance $L_b$ disposed in parallel to the capacitance $C_a$, so that a synthetic impedance thereof is maintained to be infinite ($\infty$). As a result, not only can high voltages be generated at the excitation conductance $g_0$, the ideal transformer 1a and the load 200, but also the current flowing at the side of the capacitance $C_a$ is compensated, so that it is possible to improve an current-entering efficiency to the load 200. Also, due to the impedance match based on the transformer 1, it is possible to apply a large voltage to the load 200.

Especially, in the electric power supply apparatus according to the present invention, since the parallel resonance requirement setting circuit section 10 comprises a simple circuit arrangement including only the variable inductance $L_b$ and the transformer 1 as circuit elements, the electric power supply apparatus has a practical size and weight as one to be attached to the overhead power line. Further, when the load 200 is a device featuring a small power consumption, such as a measurement device and so on, it is possible to continuously supply the electric power to the load.

(Fourth Embodiment of Present Invention)

Figure 12B:
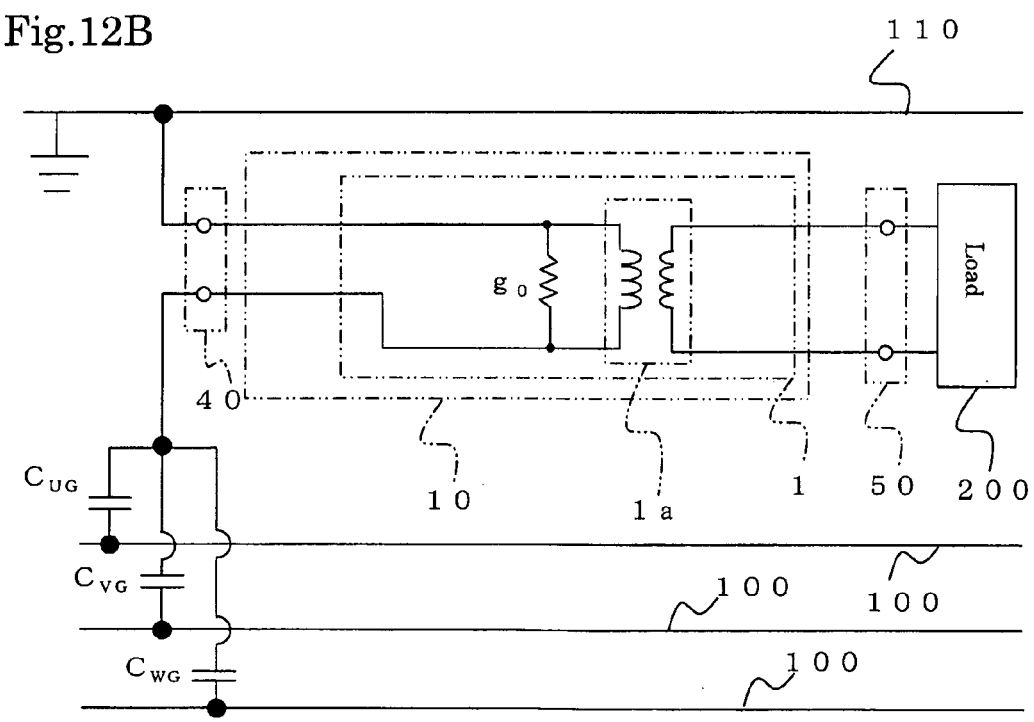

FIG. 11(a) is an explanatory view for explaining spatial capacitances on overhead power lines of a three-phase system and an overhead linear conductor; FIG. 11(b) is a schematic arrangement view showing a state in which the electric power supply apparatus according to the fourth embodiment embodying the present invention is attached to the overhead linear conductor; FIG. 12(a) is a circuit diagram showing an example of an equivalent circuit of the electric power supply apparatus shown in FIG. 11(b); and FIG. 12(b) is a circuit diagram showing the equivalent circuit shown in FIG. 12(a), in which a parallel circuit is resonated. In FIGS. 11 and 12, the same references as in FIGS. 1 to 10 indicate the same or corresponding elements, and explanations of these elements are omitted.

This fourth embodiment is different from the first, second and third embodiments only in that an electric power supply apparatus is attached to an overhead linear conductor, and has the similar functions and effects to those of the first, second and third embodiment except for below-mentioned functions and effects obtained from the fact that the electric power supply apparatus is attached to the overhead linear conductor.

In FIG. 11(a), if the overhead linear conductor 110 is an overhead ground line, it is a ground line provided on a top of a supporting structure such as a pylon, a utility pole and so on, in an aerial transmission road, whereby a thunderbolt is guided as a lighting conductor so that the overhead power line 100 is not directly struck by a thunderbolt, or so that a generation of induction lighting based on thundercloud is reduced.

Generally, since the overhead linear conductor 110 is grounded, similar to the case of the above-mentioned operation capacitances, there are capacitances between the power lines of the three-phase system and between the power lines and the overhead linear conductor 110. These capacitances are handled and converted into capacitances operating between the power lines and the overhead linear conductor 110, to thereby obtain capacitances $C_{UG}$, $C_{VG}$ and $C_{WG}$.

Herein, the operation capacitances $C_U$, $C_V$ and $C_W$ shown in FIG. 1(a) are obtaining by synthesizing capacitances which are synthesized from capacitances obtained between the overhead power lines 100 and the ground (including the overhead linear conductor 110, a grounded construction such as a supporting structure and so on) and capacitances obtained between the power lines of the three-phase system, and by recasting all the synthesized capacitances with respect to a neutral point (ground) 300a.

On the other hand, capacitances $C_{U1}$, $C_{V1}$ and $C_{W1}$ shown in FIG. 11(a) are obtain by the fact that the capacitances $C_{UG}$, $C_{VG}$ and $C_{WG}$ to the overhead linear conductor 110 are independent from the operation capacitances $C_U$, $C_V$ and $C_W$, and thus are reduced by capacitances to the neutral point (ground) 300a, with the capacitances $C_{U1}$, $C_{V1}$ and $C_{W1}$ being represented as ones being different from operation capacitances $C_U$, $C_V$ and $C_W$ shown in FIG. 1(a).

Also, in FIG. 12(b), a capacitance $C_{aG}$ is derived from a dielectric provided between the overhead linear conductor 110 and an electrode 20 attached to the overhead linear conductor 110, and a variable capacitance $C_{bG}$ is connected in parallel thereto.

In this fourth embodiment, since the electrode 20 of the electric power supply apparatus is attached to the overhead linear conductor 110, charge currents, with which the capacitances $C_{UG}$, $C_{VG}$ and $C_{WG}$ should be charged, flow from the respective power lines of the three-phase system into the overhead linear conductor 110 through the intermediary of the electrode 20, and thus it is possible to obtain a function and effect that a parallel resonance requirement setting circuit section 10 is supplied with the charge currents.

However, when the capacitances $C_{UG}$, $C_{VG}$ and $C_{WG}$ have the same values, it is impossible to obtain the electric power. This is because the values of the capacitances $C_{UG}$, $C_{VG}$ and $C_{WG}$ conform with each other when the overhead linear conductor 110 is provided along the power lines of the three-phase system so that the spaces between the overhead linear conductor 110 and the power lines of the three-phase system are equal to each other, and because the currents, with which the capacitances $C_{UG}$, $C_{VG}$ and $C_{WG}$ should be charged, are compensated with each other due to the fact that the current have the phases shifted from each other by 120 degrees ($2\pi/3$ [rad]).

Thus, in this fourth embodiment, it is necessary to provide the overhead linear conductor 110 along the power lines of the three-phase system so that the spaces between the overhead linear conductor 110 and the power lines of the three-phase system are not equal to each other.

Also, when the electric power supply apparatus is attached to the overhead linear conductor 110, since voltages are generated in the electric power supply apparatus including the electrode 20 and the load 200, it is preferable to coat the surfaces of these elements with insulating materials.

Note, in the electric power supply apparatus of the fourth embodiment, the explanation is made on the example of the parallel resonance requirement setting circuit section 10 including a transformer 1. However, although the parallel resonance requirement setting circuit section 10 is arranged as disclosed in the first embodiment or the third embodiment, it is possible to obtain the similar functions and effects to those of the fourth embodiment.

The invention claimed is:

1. An electric power supply apparatus attached to an overhead line to supply an electric power to a load, comprising:
   an electrode extending along said overhead line in a longitudinal direction thereof, with a dielectric being intervened therebetween;
   a capacitor defined by said overhead Line said dielectric and said electrode;
   an operation capacitance existing between said electrode and the ground so as to be in series to said capacitor;
   an inductor that is connected at one end to said electrode and at the other end to said overhead line so as to be in parallel to said capacitor; and
   an output section drawn from both ends of a parallel circuit including said capacitor and said inductor,
   wherein said parallel circuit is formed as a parallel resonance circuit, so that an electric power is output from said output section.

2. The electric power supply apparatus as set forth in claim 1, wherein said inductor is a variable inductor, and that inductance of said variable inductor is adjusted so that said parallel circuit is operated as the parallel resonance circuit.

3. The electric power supply apparatus as set forth in claim 1, further comprising
   a variable capacitor connected in parallel to said capacitor,
   wherein capacitance of said variable capacitor is adjusted so that said parallel circuit is operated as the parallel resonance circuit.

4. The electric power supply apparatus as set forth in claim 1, further comprising
   a transformer in which a primary voltage is stepped down, and in which a secondary voltage is output,
   wherein inductance of said inductor corresponds to an excitation susceptance component of said transformer, said output section being at a secondary side of said transformer.

5. The electric power supply apparatus as set forth in claim 1, further comprising:
   a transformer in which a primary voltage is stepped down, and in which a secondary voltage is output; and
   an inductor connected in parallel at the secondary side of said transformer to a secondary winding thereof,
   wherein the inductor connected in parallel to said capacitor corresponds to an excitation susceptance component of said transformer, said output section being at a secondary side of said transformer.

6. The electric power supply apparatus as set forth in claim 5, wherein the inductor connected in parallel at the secondary side of said transformer to the secondary winding thereof is a variable inductor, and wherein inductance of said variable inductor is adjusted so that said parallel circuit is operated as the parallel resonance circuit.

7. The electric power supply apparatus as set forth in claim 1, wherein said electrode is a tubular conductor by which a given length of said overhead line is enclosed.

8. The electric power supply apparatus as set forth in claim 7, wherein said electrode comprises a plurality of tubular conductors which have different diameters so that one of said tubular conductors is inserted into and abutted to another tubular conductor, and so that one of said tubular conductors is slidably received in another tubular conductor.

9. The electric power supply apparatus as set forth in claim 7, wherein said electrode is defined by connecting a plurality of tubular conductors to each other.

10. The electric power supply apparatus as set forth in claim 3, further comprising
   a transformer in which a primary voltage is stepped down, and in which a secondary voltage is output,
   wherein inductance of said inductor corresponds to an excitation susceptance component of said transformer, said output section being at a secondary side of said transformer.

11. The electric power supply apparatus as set forth in claim 2, wherein said electrode is a tubular conductor by which a given length of said overhead line is enclosed.

12. The electric power supply apparatus as set forth in claim 3, wherein said electrode is a tubular conductor by which a given length of said overhead line is enclosed.

13. The electric power supply apparatus as set forth in claim 4, wherein said electrode is a tubular conductor by which a given length of said overhead line is enclosed.

14. The electric power supply apparatus as set forth in claim 5, wherein said electrode is a tubular conductor by which a given length of said overhead line is enclosed.

15. The electric power supply apparatus as set forth in claim 6, wherein said electrode is a tubular conductor by which a given length of said overhead line is enclosed.

* * * * *